United States Patent [19]

Carson

[11] 4,452,952

[45] Jun. 5, 1984

[54] INCREASING THE REACTIVITY OF COUPLING HOMOPOLYMERS

[75] Inventor: William G. Carson, Cuyahoga Falls, Ohio

[73] Assignee: The Goodyear Tire & Rubber Company, Akron, Ohio

[21] Appl. No.: 505,162

[22] Filed: Jun. 17, 1983

Related U.S. Application Data

[63] Continuation-in-part of Ser. No. 337,036, Jan. 4, 1982.

[51] Int. Cl.$^3$ ............................................... C08F 8/40
[52] U.S. Cl. ..................................... 525/340; 525/375; 525/379; 525/382; 525/384; 525/385; 526/173; 526/336
[58] Field of Search ............... 525/340, 375, 379, 382, 525/384, 385; 526/173, 336

[56] References Cited

U.S. PATENT DOCUMENTS

| | | | |
|---|---|---|---|
| 3,363,659 | 1/1968 | Keckler et al. | 152/330 |
| 3,639,517 | 2/1972 | Kitchen et al. | 260/879 |
| 3,855,189 | 12/1974 | Farrar et al. | 260/85.1 |
| 3,911,054 | 10/1975 | Roest et al. | 260/880 B |
| 3,931,126 | 1/1976 | Naylor | 260/83.7 |
| 3,951,931 | 4/1976 | Burchard et al. | 260/879 |
| 4,163,764 | 8/1979 | Nash | 525/2 |
| 4,304,886 | 12/1981 | Bean, Jr. et al. | 525/314 |

Primary Examiner—Joseph L. Schofer
Assistant Examiner—Bernard Lipman
Attorney, Agent, or Firm—Alvin T. Rockhill

[57] ABSTRACT

There is disclosed a process for the preparation of elastomeric polymers which comprises contacting at least one conjugated diolefinic monomer selected from the group consisting of isoprene, piperylene, 2-ethyl-1,3-butadiene, 2,3-dimethyl-1,3-butadiene and 1,3-butadiene, mixed with at least one polyvinyl aromatic coupling compound selected from the group consisting of o, m and p-divinylbenzene, 1,2,4-trivinylbenzene, 1,8-divinylnaphthalene, 1,2-divinyl-3,4-dimethylbenzene, 2,4-divinylbiphenyl, 3,5,4'-trivinylbiphenyl and 1,3,5-trivinylbenzene under solution polymerization conditions with an organolithium catalyst, in which the amount of polyvinyl aromatic coupling compound employed contains from about 0.1 to about 10 moles of vinyl groups per mole of active lithium catalyst used to produce a living polymer and then subsequently contacting said living polymer, with (A) a polar compound selected from the group consisting of ethylene glycol dimethyl ether (glyme), diethylene glycol dimethyl ether (diglyme), triethylene glycol dimethylether (triglyme), tetraethylene glycol dimethyl ether (tetraglyme), 2,3-dimethoxybutane, N,N,N', N'tetramethylethylene-diamine (TMEDA), tri-n-butylphosphine and hexamethylphosphoric triamide (HMPA), in which the molar ratio of the said polar compounds to the active lithium based on the amount of said organolithium catalyst present at the start of the polymerization, ranges from about 0.01/1 to about 20/1 or (B) a polar compound selected from the group consisting of tetrahydrofuran, diethyl ether, triethylamine, 1,4-diazabicyclo-2.2.2-octane (DABCO), p-dioxane, tri-n-butylamine and N,N'-dimethyl piperazine, in which the molar ratio of the said compounds to the active lithium based on the amount of said organolithium catalyst present at the start of the polymerization, ranges from about 0.5/1 to about 100/1.

10 Claims, No Drawings

INCREASING THE REACTIVITY OF COUPLING HOMOPOLYMERS

This application is a continuation-in-part of Ser. No. 337,036, filed Jan. 4, 1982.

FIELD OF THE INVENTION

This invention is a process for the polymerization of conjugated diolefins with small amounts of at least one polyvinyl aromatic coupling agent, for instance, divinylbenzene, by using lithium catalysts, wherein certain polar compounds are added to force the reaction of the coupling agent and the diolefin toward completion to reduce the reaction time and the residual odor.

BACKGROUND OF THE INVENTION

In U.S. Pat. No. 3,855,189, issued Dec. 17, 1974, there is described a polymerization process which comprises (a) introducing into a polymerization zone at least one polymerizable monomer selected from the group consisting of polymerizable conjugated dienes, polymerizable monovinyl-substituted aromatic compounds, and mixtures, under polymerization conditions employing an organolithium initiator, (b) polymerizing said polymerizable monomer with said organolithium initiator, thereby forming polymer-lithium moieties, (c) treating the resulting polymerization mixture with at least one polar compound in minor amount effective to improve coupling of said polymer-lithium, wherein said polar organic compound is ether, thioether, tertiary amine, or triazine or mixture, (d) treating said polymerization reaction system with at least one polyvinyl aromatic compound in minor amounts effective to couple said polymer-lithium moieties, wherein said polar compound is added to said polymerization mixture prior to or coincidentally with said polyvinyl aromatic compound. The amount of organolithium used is an amount to provide 0.02 to 2 equivalents of lithium per 100 parts by weight of monomer charged to the polymerization system, the effective amounts of polar compound ranges from 0.001 to 5 parts by weight per 100 parts of monomer in the system and the effective amount of polyvinyl aromatic coupling agent ranges from 0.005 to about 4 moles per gram equivalent of lithium used.

In U.S. Pat. No. 3,363,659, issued Jan. 16, 1968, there is disclosed a method of preparing polymers which consist essentially of butadiene and from 0.025 to about 0.4 parts by weight parts per hundred by weight of butadiene of a comonomer having at least two terminal $=CH_2$ groups. These comonomers containing the $=CH_2$ groups are said to be aliphatic, aromatic, cyclic, acyclic, or heterocyclic and the preferred compounds are benzenes and xylenes which are substituted by two or more vinyl groups. Thus, the preferred aromatics which modify comonomers are disclosed as being di-tri-tetra-penta-substituted benzene, including divinylbenzene. The polymerization catalyst therein disclosed was said to be alkyllithium compounds, such as butyllithium.

The present invention distinguishes from the prior art in that the U.S. Pat. No. 3,363,659 does not disclose the use of treating the active lithium terminated living polymers with polar compounds which form the basis of the present invention.

The present invention distinguishes from the U.S. Pat. No. 3,855,189 disclosure in that the present invention adds the polyvinyl aromatic compound prior to the polymerization of the conjugated diolefin monomer, not as a post-treatment as suggested in this reference.

The use of the polyvinyl aromatic compounds results in the formation of branched polymer chains.

SUMMARY OF THE INVENTION

There is disclosed a process for the preparation of elastomeric polymers which comprises contacting at least one conjugated diolefinic monomer selected from the group consisting of isoprene, piperylene, 2-ethyl-1,3-butadiene, 2,3-dimethyl-1,3-butadiene and 1,3-butadiene, mixed with at least one polyvinyl aromatic coupling compound selected from the group consisting of o, m and p-divinylbenzene, 1,2,4-trivinylbenzene, 1,8-divinylnaphthalene, 1,2-divinyl-3,4-dimethylbenzene, 2,4-divinylbiphenyl, 3,5,4'-trivinylbiphenyl and 1,3,5-trivinylbenzene under solution polymerization conditions with an organolithium catalyst, in which the amount of polyvinyl aromatic coupling compound employed contains from about 0.1 to about 10 moles of vinyl groups per mole of active lithium catalyst used to produce a living polymer and then subsequently contacting said living polymer, with (A) a polar compound selected from the group consisting of ethylene glycol dimethyl ether (glyme), diethylene glycol dimethyl ether (diglyme), triethylene glycol dimethylether (triglyme), tetraethylene glycol dimethyl ether (tetraglyme), 2,3-dimethyoxybutane, N,N,N',N'tetramethylethylene-diamine (TMEDA), tri-n-butylphosphine and hexamethylphosphoric triamide (HMPA), in which the molar ratio of the said polar compounds to the active lithium based on the amount of said organolithium catalyst present at the start of the polymerization, ranges from about 0.01/1 to about 20/1 or (B) a polar compound selected from the group consisting of tetrahydrofuran, diethyl ether, triethylamine, 1,4-diazabicyclo-2.2.2-octane (DABCO), p-dioxane, tri-n-butylamine and N,N'-dimethyl piperazine, in which the molar ratio of the said compounds to the active lithium based on the amount of said organolithium catalyst present at the start of the polymerization, ranges from about 0.5/1 to about 100/1.

DETAILED DISCLOSURE OF THE INVENTION

The polymerization of the diolefins in accordance with the present invention are usually carried out in an inert solvent, such as a hydrocarbon. It has been found, however, that all hydrocarbons will not be appropriate for the ideal practice of the instant invention. Those persons skilled in the art of the polymerization of hydrocarbons, a solution polymerization system, will readily be able to determine the best solvent system required for the polymerization. Representative of some hydrocarbons that can be utilized in this invention are benzene, toluene, cyclohexane, cyclopentene, and methylcyclopente. In certain hydrocarbons the alkyllithium compounds employed in the catalyst are not very soluble.

According to those skilled in the art one would surmise that if a coupling agent, such as divinyl benzene, were introduced into the polymerization system prior to contacting the conjugated diolefin monomer with the organolithium catalyst, it would be expected that a high percentage of the resulting polymer would contain a substantial amount of gel. Gel in conjugated diolefin polymers results from excessive amounts of crosslinks between or among conjugated diolefin polymer chains. This gel would be expected because the polyvinyl aromatic crosslinking agents are polyfunctional and it would be expected that many of the polymer chains would be highly crosslinked. However, it has been unexpectedly discovered that the homopolymers produced by the method of the present invention do not contain a high percentage of gel nor are they appreciably crosslinked. It has also been discovered that most of the branching agents, for instance, divinylbenzene, have been found on the ends of the homopolymer blocks rather than to cause crosslinking between the homopolymer chains.

The organolithium catalysts useful in the practice of this invention are any of the organolithium compounds that correspond to the formula RLi, in which the R is a hydrocarbon radical and Li is lithium, such as aromatic organolithium compounds, aliphatic organolithium compounds, and cyclo aliphatic organolithium compounds. The preferred organolithium compounds employed in the polymerization of this invention are usually alkyllithium compounds, representative are n-butyllithium, sec butyllithium, isopropyllithium, amyllithium and phenyllithium.

It should be understood that those skilled in the art readily understand that the molecular weight of the homopolymers of the conjugated diolefins of the present invention are readily controlled by the amount of catalyst employed. Those skilled in the art will readily understand there is usually a polymerization chain started by each atom of lithium contained in the organolithium catalyst. Thus, the larger amount of catalyst employed, the greater the number of polymer chains initiated. It is usually a rule of thumb, the more catalyst employed, the lower the molecular weight of the final polymers. Furthermore, the amount of organolithium catalyst employed depends on other factors; such as the purity of the polymerization system; the purity of the polyvinyl aromatic coupling agent employed and the desired molecular weight of the conjugated diolefin homopolymer. Typically, one may employ from about 0.001 to about 1.0 parts of the lithium initiator per one hundred parts by weight of the monomer to be polymerized.

The polymerization temperature which may be employed in the practice of the present invention is not critical and may vary from a low of about 0° C. or below to a high of about 150° C.

The monomers which are employed are diolefins containing from 4 carbon atoms to about 12 carbon atoms, such as isoprene, piperylene, 2-ethyl-1,3-butadiene, 2,3-dimethyl-1,3-butadiene, 1,3-butadiene, and the like.

In the prior art methods of coupling lithium terminated homopolymers, a very exact stoichiometry must be maintained between the coupling agent and the terminal polymer lithium. In those methods, the coupling agent is added after the formation of the (still living) lithium terminated homopolymer. Extreme care must be taken that terminating impurities in the coupling agent are absent or are not introduced with it. Otherwise, there is a possibility of too much crosslinking and the gel will result. Likewise, a deficiency or excess of coupling agent, such as $SiCl_4$ or $CHCl_3$, will also result in a highly gelled or a polymer not crosslinked at all.

In the instant invention, the need to maintain an extremely strict stoichiometry between the coupling agent and the active terminal lithium has been eliminated. The mole ratio of vinyl groups contained in the coupling agent to the active lithium employed can range from about 0.1/1 to about 6.0/1 and even up to about 10/1. The preferred mole ratio of vinyl groups contained in the coupling agent to active lithium is from about 0.2/1 to about 4/1. A more preferred ratio is from 0.4/1 to 1/1.

It should be pointed out that there are two groups of polar compounds useful in the present invention. One group of polar compounds are the so-called strong donors. They are ethylene glycol dimethyl ether (glyme), diethylene glycol dimethyl ether (diglyme), triethylene glycol dimethyl ether (triglyme), tetraethylene glycol dimethyl ether (tetraglyme), 2,3-dimethoxybutane, N,N,N',N'-tetramethylethylene diamine (TMEDA), tri-n-butylphosphine and hexamethylphosphoric triamide (HMPA), in which the molar ratio of the said polar compounds to the active lithium ranges from about 0.01/1 to about 20/1. A more preferred molar ratio of the strong donors range from about 1/1 to about 5/1 of the strong donor compounds to the active lithium catalyst employed.

Another group of polar compounds are also useful in the invention. However, these compounds require a higher level to be as effective and are referred to as weak donors or modifiers. They are selected from the group consisting of tetrahydrofuran, diethyl ether, triethylamine, 1,4-diazabicyclo-2.2.2-octane (DABCO), p-dioxane, tri-n-butylamine and N,N'-dimethylpiperazine, in which the molar ratio of the said polar compounds to the active lithium ranges from about 0.5/1 to about 100/1. A more preferred molar ratio of the weak donors range from about 4/1 to about 50/1 of the weak donor compounds to the active lithium catalyst employed.

The polyvinyl aromatic coupling compound useful in the invention are selected from the group consisting of o, m and p-divinylbenzene, 1,2,4-trivinylbenzene, 1,8-divinylnaphthalene, 1,2-divinyl-3,4-dimethylbenzene, 2,4-divinylbiphenyl, 3,5,4'-trivinylbiphenyl and 1,3,5-trivinylbenzene. They are usually employed in amounts that contain from about 0.1 to about 10 moles of vinyl groups per mole of active lithium catalyst used to produce the living hompolymer.

The practice of this invention is further illustrated by reference to the following examples which are intended to be representative rather than restrictive of the scope of the invention. Unless otherwise indicated, all parts and percentages are by weight.

EXAMPLE 1

In this example butadiene was copolymerized with small amounts of divinylbenzene by the use of sec-butyllithium catalyst in cyclohexane solvent at 65° C. for various periods of time at varying divinylbenzene/active lithium catalyst molar ratios. After certain polymerization times, the strong donor, diethylene glycol dimethylether (diglyme) was added to the polymerization mixture at a 4/1 diglyme to active lithium mole ratio.

The procedure employed was that a premix of butadiene (95.5%) was mixed with cyclohexane to give a 11.0 weight percent butadiene in the premix mixture. This premix was passed through silica gel and charged into a number of 4 oz. bottles. Divinylbenzene (DVB) ranging from 0.5 to 4 moles of DVB per mole of lithium to be used as a catalyst was added just prior to the catalyst addition. Sufficient sec-butyllithium was added to give 40,000 kinetic molecular weight polybutadiene. The polymerization was carried out at a 65° C. water bath for various times. At the end of the polymerization times diglyme, when employed, was added by being injected with a syringe through a hole in the screw-cap bottle at a constant 4/1—diglyme/Li ratio. These bottles were then replaced in the bath for an additional period of time. The polymerizations were shortstopped with methanol. The residual analysis of DVB and ethylvinylbenzene (EVB) were determined by gas chromatographic analysis. After this analysis had been made a shortstop was added and the polymer vacuum dried to a constant weight. The dilute solution viscosity (DSV) measurements were made in toluene at 30° C.

The results and conditions are set forth in Table I below in which column 1 is the DVB/Li ratio; column 2 is the polymerization time in minutes; column 3 is dilute solution viscosity; column 4 is the post-treatment time in minutes after the diglyme was added; column 5 is the residual weight percent DVB and column 6 is the percent gel measured after the diglyme treatment.

TABLE I

| DVB/Li | Pzn Time, Min. | DSV$^a$ | Post-treatment time, min. | DSV. After Diglyme | % Gel |
|---|---|---|---|---|---|
| 4/1 | 30 | 0.78 | 3 | 1.28 | |
| | 60 | 1.10 | 5 | 1.99 | |
| | | | 10 | — | 86 |
| | 90 | 1.19 | 10 | — | 92 |
| 3/1 | 30 | 0.74 | 5 | 1.59 | |
| | 60 | 0.98 | 5 | 1.54 | |
| | 90 | 1.05 | 5 | 1.42 | |
| | | | 10 | — | 73 |
| 2/1 | 30 | 0.74 | 5 | 1.15 | |
| | 60 | 0.89 | 5 | 1.37 | |
| | 90 | 1.04 | 5 | 1.16 | |
| | | | 30 | 2.06 | |
| | | | 100 | 2.18 | |
| 1/1 | 30 | 0.62 | 5 | 0.88 | |
| | 60 | 0.75 | 5 | 1.06 | |
| | 90 | 0.79 | 30 | 1.12 | |
| | | | 120 | 1.12 | |
| 0.5/1 | 30 | 0.56 | 5 | 0.77 | |
| | 60 | 0.60 | 5 | 0.84 | |

$^a$Toluene, 30° C. Gel values listed only when above 2%.
DSV reported in dynes/grams.

EXAMPLE 2

In this example the procedure employed was identical to that of Example 1 except that the effect of the diglyme post-treatment was measured as it relates to the dilute solution viscosity (DSV) before and after the post-treatment with the diglyme. As can be seen from the results, the post-treatment with diglyme increased the DSV of the polymer considerably.

TABLE II

| DVB/Li | Pzn Time, Min. | DSV$^a$ | Post-treatment time, min. | DSV, After Diglyme | % Gel |
|---|---|---|---|---|---|
| 4/1 | 30 | 0.78 | 3 | 1.28 | |
| | 60 | 1.10 | 5 | 1.99 | |
| | | | 10 | — | 86 |
| | 90 | 1.19 | 10 | — | 92 |
| 3/1 | 30 | 0.74 | 5 | 1.59 | |
| | 60 | 0.98 | 5 | 1.54 | |
| | 90 | 1.05 | 5 | 1.42 | |
| | | | 10 | — | 73 |
| 2/1 | 30 | 0.74 | 5 | 1.15 | |
| | 60 | 0.89 | 5 | 1.37 | |
| | 90 | 1.04 | 5 | 1.16 | |
| | | | 30 | 2.06 | |
| | | | 100 | 2.18 | |
| 1/1 | 30 | 0.62 | 5 | 0.88 | |
| | 60 | 0.75 | 5 | 1.06 | |
| | 90 | 0.79 | 30 | 1.12 | |
| | | | 120 | 1.12 | |

TABLE II-continued

| DVB/Li | Pzn Time, Min. | DSV$^a$ | Post-treatment time, min. | DSV, After Diglyme | % Gel |
|---|---|---|---|---|---|
| 0.5/1 | 30 | 0.56 | 5 | 0.77 | |
| | 60 | 0.60 | 5 | 0.84 | |

$^a$Toluene 30° C. Gel values listed only when above 2%.
DSV reported in dynes/grams.

EXAMPLE 3

In this example, using the same procedure as was specified in Example 1, with a molar ratio of DVB to lithium of 3:1 being employed for a 3 hour polymerization time, different strong donors or modifiers were employed. The results are set forth in Table 3 in which column 1 is the particular polar compound employed as the modifier; column 2 is the modifier/lithium mole ratio; column 3 is the post-treatment time after the addition of the modifier; column 4 is the residual weight percent of the divinylbenzene; column 5 is the residual weight of the ethylvinylbenzene and column 6 is the dilute solution viscosity (DSV).

TABLE III

| Donor | Donor/Li | Post-Treatment Time, min | Residual, %$^a$ DVB | EVB | DSV$^b$ |
|---|---|---|---|---|---|
| Diglyme | — | — | 0.041 | 0.066 | 1.05 |
| | 4 | 5 | 0.001 | 0.043 | 2.27 |
| | | 3 | 0.003 | 0.051 | 1.88 |
| | | 1 | 0.012 | 0.059 | 1.51 |
| | 2 | 5 | 0.003 | 0.052 | 1.99 |
| | | 3 | 0.006 | 0.054 | 1.73 |
| | | 1 | 0.014 | 0.057 | 1.48 |
| Mono-glyme | 4 | 5 | 0.002 | 0.048 | 2.17 |
| | | 3 | 0.005 | 0.051 | 1.85 |
| | | 1 | 0.014 | 0.057 | 1.57 |
| | 2 | 5 | 0.005 | 0.049 | 1.99 |
| | | 3 | 0.008 | 0.054 | 1.68 |
| | | 1 | 0.017 | 0.057 | 1.52 |
| TMEDA | 4 | 5 | 0.003 | 0.047 | 1.62 |
| | | 3 | 0.007 | 0.050 | 1.35 |
| | | 1 | 0.022 | 0.058 | 1.28 |
| | 2 | 5 | 0.005 | 0.052 | 1.55 |
| | | 3 | 0.011 | 0.055 | 1.42 |
| | | 1 | 0.026 | 0.063 | 1.27 |

$^a$Initial levels: 0.112% DVB, 0.085% EVB.
$^b$Toluene, 30° C. Gel values were 3% or less.

EXAMPLE 4

In this example there is an illustration of the so-called weak polar compounds or weak modifiers are compared with diglyme. It should be noticed that the donor/lithium molar ratio has been substantially increased. The polymerization time was held constant at 60 minutes at 65° C. The post-treatment time after the addition of the donor was 10 minutes. The DVB/lithium ratio was 4/1.

TABLE IV

| Donor | Donor/Li | Residual, %$^a$ DVB | EVB | DSV$^b$ |
|---|---|---|---|---|
| Diglyme$^c$ | — | 0.057 | 0.070 | 1.23 |
| | 4 | 0.005 | 0.059 | 1.81 |
| Et$_2$O | 4 | 0.051 | 0.072 | 1.35 |
| | 25 | 0.046 | 0.069 | 1.49 |
| | 50 | 0.039 | 0.067 | 1.54 |
| 1,3 Dioxolane | 25 | 0.039 | 0.066 | 1.48 |
| | 50 | 0.035 | 0.065 | 1.62 |
| THF | 4 | 0.038 | 0.074 | 1.44 |
| | 25 | 0.016 | 0.058 | 1.77 |

TABLE IV-continued

| Donor | Donor/Li | Residual, %[a] | | |
|---|---|---|---|---|
| | | DVB | EVB | DSV[b] |
| | 50 | 0.009 | 0.054 | 2.06 |

[a] Initial levels: 0.148% DVB, 0.094% EVB
[b] Toluene, 30° C.
[c] Five minute post-treatment While certain representative embodiments and details have been shown for the purpose of illustrating the invention, it will be apparent to those skilled in this art that various changes and modifications may be made therein without departing from the scope of the invention.

What is claimed is:

1. A process for the preparation of elastomeric polymers which comprises contacting at least one conjugated diolefinic monomer selected from the group consisting of isoprene, piperylene, 2-ethyl-1,3-butadiene, 2,3-dimethyl-1,3-butadiene and 1,3-butadiene, mixed with at least one polyvinyl aromatic coupling compound selected from the group consisting of o, m and p-divinylbenzene, 1,2,4-trivinylbenzene, 1,8-divinylnaphthalene, 1,2-divinyl-3,4-dimethylbenzene, 2,4-divinylbiphenyl, 3,5,4'-trivinylbiphenyl and 1,3,5-trivinylbenzene under solution polymerization conditions with an organolithium catalyst, in which the amount of polyvinyl aromatic coupling compound employed contains from about 0.1 to about 10 moles of vinyl groups per mole of active lithium catalyst used to produce a living polymer and then subsequently contacting said living polymer, with (A) a polar compound selected from the group consisting of ethylene glycol dimethyl ether (glyme), diethylene glycol dimethyl ether (diglyme), triethylene glycol dimethylether (triglyme), tetraethylene glycol dimethyl ether (tetraglyme), 2,3-dimethyoxybutane, N,N,N',N'tetramethylethylene-diamine (TMEDA), tri-n-butylphosphine and hexamethylphosphoric triamide (HMPA), in which the molar ratio of said polar compounds to the active lithium based on the amount of said organolithium catalyst present at the start of the polymerization, ranges from about 0.01/1 to about 20/1 or (B) a polar compound selected from the group consisting of tetrahydrofuran, diethyl ether, triethylamine, 1,4-diazabicyclo-2.2.2-octane (DABCO), p-dioxane, tri-n-butylamine and N,N'-dimethyl piperazine, in which the molar ratio of the said compounds to the active lithium based on the amount of said organolithium catalyst present at the start of the polymerization, ranges from about 0.5/1 to about 100/1.

2. A process according to claim 1 in which the conjugated diolefin is butadiene or isoprene and the lithium catalysts is n-butyllithium or sec-butyllithium.

3. A process according to claim 1 in which the polar compound of (A) is glycol dimethyl ether, diethyl glycol dimethyl ether or N,N,N',N'-tetramethyl ethylene diamine.

4. A process according to claim 1 in which the polar compound of (A) is tetrahydrofuran or 1,3-diazabicyclo 2.2.2-octane.

5. A process according to claim 1 in which the amount of polyvinyl aromatic coupling compound employed contains 0.2 to 4 moles of vinyl groups per mole of active lithium catalyst employed.

6. A process according to claim 3 in which the molar ratio of polar compound (A) to the active lithium employed ranges from the mole ratio of 1/1 to 5/1.

7. A process according to claim 4 in which the molar ratio of polar compound (B) ranges from about 4/1 to about 50/1 per mole of active lithium catalyst employed.

8. A process according to claim 1 wherein the monomer employed is butadiene or isoprene, the alkyllithium catalyst is n-butyllithium or sec-butyllithium, the polar compound is glycol dimethyl ether or diethyl glycol dimethyl ether or N,N,N',N'-tetramethyl ethylene diamine and the polyvinyl aromatic coupling compound is divinylbenzene.

9. A process according to claim 1 wherein the monomer employed is butadiene or isoprene, the alkyllithium catalyst is n-butyllithium or sec-butyllithium, the polar compound is tetrahydrofuran or 1,4-diazabicyclo-2.2.2-octane.

10. A process according to claim 5 in which the amount of polyvinyl aromatic coupling compound employed contains from 0.4 to 1 mole of vinyl groups per mole of active lithium catalyst employed.

* * * * *